(12) United States Patent
Ho et al.

(10) Patent No.: US 6,528,136 B1
(45) Date of Patent: *Mar. 4, 2003

(54) RHEOLOGY MODIFICATION OF POLYMERS PREPARED USING METALLOCENES

(75) Inventors: Thoi H. Ho, Lake Jackson, TX (US); Wendy D. Hoenig, Lake Jackson, TX (US); Che-I Kao, Lake Jackson, TX (US); Michael E. Rowland, Lake Jackson, TX (US); Clark H. Cummins, Midland, MI (US); Michael J. Mullins, Lake Jackson, TX (US); H. Craig Silvis, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/140,603

(22) Filed: Aug. 26, 1998

Related U.S. Application Data

(60) Provisional application No. 60/057,582, filed on Aug. 27, 1997.

(51) Int. Cl.[7] .................. B29D 22/00; B29D 23/00; B32B 1/08; C08C 19/20; C08F 8/34
(52) U.S. Cl. .................. 428/36.8; 428/35.2; 428/35.7; 524/194; 525/344; 525/332.7; 525/351
(58) Field of Search .................. 524/194; 428/35.2, 428/36.8, 36.9, 35.7; 525/344, 332.7, 351

(56) References Cited

U.S. PATENT DOCUMENTS

| | | | |
|---|---|---|---|
| 3,058,944 A | 10/1962 | Breslow et al. | 260/41 |
| 3,203,936 A | 8/1965 | Breslow et al. | 260/79.3 |
| 3,203,937 A | 8/1965 | Breslow et al. | 260/79.3 |
| 3,282,864 A | 11/1966 | Best et al. | 260/2.5 |
| 3,298,975 A | 1/1967 | Feild et al. | 260/2.5 |
| 3,336,268 A | 8/1967 | Cox | 260/79.3 |
| 3,341,480 A | 9/1967 | Feild et al. | 260/2.5 |
| 3,389,198 A | 6/1968 | Taber | 264/52 |
| 3,530,108 A | 9/1970 | Oppenlander et al. | 260/93.7 |
| 4,352,892 A | 10/1982 | Lohmar | 521/79 |
| 4,579,905 A | 4/1986 | Krabbenhoft | 525/63 |
| 4,694,025 A | 9/1987 | Park | 521/88 |
| 4,714,716 A | 12/1987 | Park | 521/80 |
| 5,037,895 A | 8/1991 | Marker et al. | 525/351 |
| 5,118,531 A | 6/1992 | Petersen et al. | 427/230 |
| 5,498,581 A | 3/1996 | Welch | 502/102 |
| 5,594,078 A | 1/1997 | Welch | 526/119 |
| 5,654,454 A | 8/1997 | Peifer | 556/11 |

FOREIGN PATENT DOCUMENTS

| | | | | |
|---|---|---|---|---|
| CA | 797917 | * | 10/1968 | 405/51 |
| CA | 1024296 | | 1/1978 | |
| EP | 1080619 | | 8/1967 | |
| EP | 0 702 032 A2 | | 3/1996 | |
| GB | 2 205 103 A | | 11/1988 | |
| JP | 46/31756 | | 9/1971 | |
| JP | 50-133248 | | 10/1975 | |
| WO | 96/07681 | | 3/1996 | |

OTHER PUBLICATIONS

R. A. Abramovitch, "Polar Radicals in Aromatic Substitution", *Intra–Science Chemistry Reports*, pp. 211–218, (1969).

R. A. Abramovitch, G. N. Knaus, M. Pavlin, and W. D. Holcomb, "Reaction of Sulphonyl Azides with Unstrained Olefins", *J. Chem. Soc.*, pp. 2169–2172, (1974).

R. A. Abramovitch, T. Chellathurai, W. D. Holcomb, I. T. McMaster, and D. P. Vanderpool, "Intramolecular Insertion of Arylsulfonylnitrenes into Aliphatic Side Chains[1]", *J. Org. Chem.*, vol. 42, No. 17, pp. 2920–2926, (1977).

(List continued on next page.)

*Primary Examiner*—Harold Pyon
*Assistant Examiner*—Michael C. Miggins
(74) *Attorney, Agent, or Firm*—Whyte Hirschboeck Dudek SC

(57) ABSTRACT

The invention includes a process of preparing a coupled polymer comprising heating an admixture containing (1) at least one polyolefin comprising ethylene and optionally at least one comonomer which is selected from alpha olefins having at least 3 carbon atoms, dienes and combinations thereof said polyolefin having a molecular weight distribution of less than or equal to about 3 and (2) a coupling amount at least one poly(sulfonyl azide) to at least the decomposition temperature of the poly(sulfonyl azide) for a period sufficient for decomposition of at least about 80 weight percent of the poly(sulfonyl azide) and sufficient to result in a coupled polymer; particularly where the polyolefin is the product of polymerization of ethylene and optionally at least one other alpha-olefin in the presence of a single site catalyst (transition metal like Va or Cr, metallocene or constrained geometry). The amount of poly(sulfonyl azide) is preferably from about 0.01 to about 5 weight percent of the polyolefin. The poly(sulfonyl azide)and polyolefin preferably react at a temperature at least the decomposition temperature and greater than about 150° C. The invention also includes any composition made by the process of the invention and any article made from the composition as well as processes for making the articles, particularly melt processing (especially where the article is formed from a melt of a composition of the invention), more preferably selected by molding, blow molding or extrusion blow molding the composition. The invention also includes the use of a composition of the invention in any of these processes.

7 Claims, No Drawings

OTHER PUBLICATIONS

R. A. Abramovitch, S. B. Hendi, and A. O. Kress, "Pyrolysis of Phenylalkylsulphonyl Azides and 2–phenethyl Azidoformate. Selectivity of Sulphonylnitrenes and Contrast between Sulphonyl– and Carbonyl–nitrenes", *J. Chem. Soc., Chem. Commun.*, pp. 1087–1088, (1981).

R. A. Abramovitch, M. Ortiz, and S. P. McManus, "Reaction of Aromatic Sulfonyl Azides with Dienes", *J. Org. Chem.*, vol. 46, pp.330–335, (1981).

H. Radusch, J. Ding, and M. Schulz, "Chemical coupling of polystyrene and polybutadiene in melt mixtures by using an organic sulfonylazide", *Die Angewandte Makromolekulare Chemie*, vol. 204, pp. 177–189, (1993).

N. Takashima, Y. Nakayama, "The Processings of Crosslinked Plastics", *Kogaku Kogyo* (*Chemical Industry*), pp. 34(378)–39(383), (1969).

D. S. Breslow, M. F. Sloan, N. R. Newburg, and W. B. Renfrow, "Thermal Reactions of Sulfonyl Azides", *J. Amer. Chem. Soc.*, vol. 91, pp. 2273–2279, (1969).

Derwent Chemical Abstract No. 77–02552Y of JP 51134762 A.

P. Mapleston, "PP foam sheet emerges as a contender for a range of applications", *Modern Plastics*, pp. 110–111, (1997).

* cited by examiner

RHEOLOGY MODIFICATION OF POLYMERS PREPARED USING METALLOCENES

This application claims the benefit of U.S. Provisional Application No. 60/057,582, filed Aug. 27, 1997 which is hereby incorporated by reference herein in its entirety.

This invention relates to coupling of polyolefins, more specifically coupling of polyolefins using insertion into carbon hydrogen (C—H) bonds.

As used herein, the term "rheology modification" means change in melt viscosity of a polymer as determined by dynamic mechanical spectroscopy. Preferably the melt strength increases while maintaining the high shear viscosity (that is viscosity measured at a shear of 100 rad/sec by DMS) so that a polymer exhibits more resistance to stretching during elongation of molten polymer at low shear conditions (that is viscosity measured at a shear of 0.1 rad/sec by DMS) and does not sacrifice the output at high shear conditions.

Polyolefins are frequently rheology modified using non-selective chemistries involving free radicals generated for instance using peroxides or high energy radiation. However, chemistries involving free radical generation at elevated temperatures also degrade the molecular weight, especially in polymers containing tertiary hydrogen such as polystyrene, polypropylene, polyethylene copolymers etc. The reaction of polypropylene with peroxides and pentaerythritol triacrylate is reported by Wang et al., in Journal of Applied Polymer Science, Vol. 61, 1395–1404 (1996). They teach that branching of isotactic polypropylene can be realized by free radical grafting of di- and tri-vinyl compounds onto polypropylene. However, this approach does not work well in actual practice as the higher rate of chain scission tends to dominate the limited amount of chain coupling that takes place. This occurs because chain scission is an intra-molecular process following first order kinetics, while branching is an inter-molecular process with kinetics that are minimally second order. Chain scission results in lower molecular weight and higher melt flow rate than would be observed were the chain coupling not accompanied by scission. Because scission is not uniform, molecular weight distribution increases as lower molecular weight polymer chains referred to in the art as "tails" are formed.

The teachings of U.S. Pat. Nos. 3,058,944; 3,336,268; and 3,530,108 include the reaction of certain poly(sulfonyl azide) compounds with isotactic polypropylene or other polyolefins by nitrene insertion into C—H bonds. The product reported in U.S. Pat. No. 3,058,944 is crosslinked. The product reported in U.S. Pat. No. 3,530,108 is foamed and cured with cycloalkane-di(sulfonyl azide) of a given formula. In U.S. Pat. No. 3,336,268 the resulting reaction products are referred to as "bridged polymers" because polymer chains are "bridged" with sulfonamide bridges. The disclosed process includes a mixing step such as milling or mixing of the poly(sulfonyl azide) and polymer in solution or dispersion then a heating step where the temperature is sufficient to decompose the poly(sulfonyl azide) (100° C. to 2250 depending on the azide decomposition temperature). The starting polypropylene polymer for the claimed process has a molecular weight of at least about 275,000. Blends taught in U.S. Pat. No. 3,336,268 have up to about 25 percent ethylene propylene elastomer.

U.S. Pat. No. 3,631,182 taught the use of azido formate for crosslinking polyolefins. U.S. Pat. No. 3,341,418 taught the use of sulfonyl azide and azidoformate compounds to crosslink certain thermoplastics (PP (polypropylene), PS (polystyrene), PVC (poly(vinyl chloride)) and their blends with certain rubbers(polyisobutene, EPDM,(ethylene propylene diene rubber)).

Similarly, the teachings of Canadian patent 797,917 (family member of NL 6,503,188) include rheology modification using from about 0.001 to 0.075 weight percent poly(sulfonyl azide) to modify homopolymer polyethylene and its blend with polyisobutylene. It would be desirable to have polymers rheology modified rather than crosslinked (that is having less than about 10 percent gel as determined by xylene extraction specifically by ASTM 2765). Which polymers are advantageously made using single site catalysts, preferably single site metallocene or single site constrained geometry catalyst and, thus, desirably of narrow molecular weight distribution (MWD=Mw/Mn, where Mw is the weight average molecular weight, and Mn is the number average molecular weight) (that is having MWD preferably less than or equal to about 3.0, most preferably less than about 2.5 Mw/Mn). The surprising results are especially evident when the starting material is high density polyethylene (density greater than 0.945 g/ml) (hereinafter HDPE of narrow MWD) which polymers advantageously have a combination of good processibility as indicated by higher melt strength at a constant low shear viscosity e.g. 0.1 rad/sec measured by DMS, and higher toughness, tensile and/or elongation than a high density polyethylene of broader molecular weight distribution treated with sulfonyl azides according to the practice of the prior art using the same equivalents (stoichiometry) of coupling reactant to polymer, and higher toughness than that of the same starting material coupled or rheology modified using the same equivalents of a free radical coupling agent. Desirably, the product would have better organoleptics than coupled broader MWD HDPE. Advantageously, compositions would have less undesirable odor than the same starting materials coupled or rheology modified using the same chemical equivalents of free radical generating agents. Preferably, a process of the invention would result in more consistent coupling than methods of coupling involving free radicals, that is use of the same reactants, amounts and conditions would result in consistent amounts of coupling or consistent (reproducible) property changes, especially consistent amounts of gel formation. Preferably, a process would be less subject to effects from the presence of oxygen than would a coupling or rheology modification involving agents which generate free radicals.

In the case of, medium and lower density polyethylene (that is polymers having a density of from about 0.94 g/cc to about 0.90 g/cc), which are advantageously copolymers of ethylene in which the percent comonomer is preferably about 0.5 to 5 mole percent comonomer based on total polymer as determined by ASTM 5017, the polymers would desirably show a combination of processability improved over the starting material with retention of toughness, low heat seal initiation temperature, low haze, high gloss or hot tack properties characteristic of the starting material.

In the case of elastomeric polymers containing ethylene repeating units in which the preferred comonomer content is about 5–25 mole percent, and preferably a density less than about 0.89 g/mL, it would be desirable to have better mechanical properties such as elongation and tensile strength than would be achieved in the starting material or by coupling using the same chemical equivalents of free radical generating agent like a peroxide.

SUMMARY OF THE INVENTION

It has now been found that polymers having a narrow molecular weight distribution or formed using single site catalysts, especially polyolefins formed using transition metal catalysts other than Ziegler Natta catalysts, particularly where the molecular weight distribution is 3 or less, are surprisingly effectively coupled using poly(sulfonyl azide) coupling agents. The resulting coupled polymers have at least one of the desirable properties listed.

The invention includes a process of preparing a coupled polymer comprising heating an admixture containing (1) at least one polyolefin comprising ethylene and optionally at least one comonomer which is selected from alpha olefins having at least 3 carbon atoms, dienes and combinations thereof said polyolefin having a molecular weight distribution of less than or equal to about 3 and (2) a coupling amount at least one poly(sulfonyl azide) to at least the decomposition temperature of the poly(sulfonyl azide) for a period sufficient for decomposition of at least about 80 weight percent of the poly(sulfonyl azide) and sufficient to result in a coupled polymer; particularly where the polyolefin is the product of polymerization of ethylene and optionally at least one other alpha-olefin in the presence of a single site catalyst (e.g. transition metal like V or Cr, metallocene or constrained geometry). The amount of poly(sulfonyl azide) is preferably from about 0.01 to about 5 weight percent of the polyolefin. The poly(sulfonyl azide)and polyolefin preferably react at a temperature at least the decomposition temperature and greater than about 150° C. The invention also includes any composition made by the process of the invention and any article made from the composition as well as processes for making the articles, particularly melt processing (especially where the article is formed from a melt of a composition of the invention), more preferably selected by molding, blow molding or extrusion blow molding the composition. The invention also includes the use of a composition of the invention in any of these processes.

DETAILED DESCRIPTION OF THE INVENTION

Practice of the invention is applicable to any thermoplastic polymer polymerized using a single site catalyst which polymer has at least one C—H bond that can react with azide including homopolymers and copolymers with narrow and broad (including bimodal) comonomer distribution such as copolymers of ethylene with one or more alpha olefin (C3 to C20), ethylene copolymers with unsaturation (EPDM or EODM, that is ethylene-propylene-diene or ethylene-octene-diene), or other polymers such as linear high density polyethylene, styrene based block copolymers (SBS, SEBS, SIS and the like, that is styrene/butadiene/styrene, styrene/ethylene/butylene/styrene (hydrogenated SEBS), styrene/isoprene/styrene and the like), substantially random interpolymers of at least one alpha-olefin with at least one vinylidene aromatic or hindered vinylidene aliphatic comonomer including ethylene-styrene interpolymers, syndiotactic polystyrene, atactic polystyrene, and combinations thereof. The polymers are advantageously prepared using single site catalysts and thus, advantageously have a narrow molecular weight distribution MWD=Mw/Mn, that is a lower MWD than a polymer of the same composition and average molecular weight made using a Ziegler-Natta catalyst, preferably less than or equal to about 3.

The term "bimodal" is used to refer to polymers which exhibit two peaks on a graphical representation of data from analysis appropriate to measure the property discussed. For instance, in the case of molecular weight, a gel permeation chromatography (GPC) curve is used to determine the distribution of molecular weights. These distributions are viewed statistically, that is as statistical distributions. Thus where there is one peak, the distribution has one mode and is unimodal. Polymer which exhibit two peaks by this analytical method is referred to as bimodal. Polymers which exhibit two or more are multimodal. In the case of molecular weight distribution, bimodal polymers are often blends of two polymers with different number average molecular weights. The blend is optionally an in-reactor blend or a blend formed by passing a first polymer made in a first reactor into a second reactor where the second polymer is produced. Bimodal polymers are illustrative of multimodal polymers herein. That is, where polymers having a bimodal characteristic are discussed, the multimodal counterpart is also suitable. Those skilled in the art recognize that the peaks frequently have overlapping areas and that mathematical analysis is sometimes needed to distinguish multimodal curves from broad irregular curves.

In this invention, where preferred molecular weight distributions (MWD) are given, those distributions refer to the MWD of at least one component as represented by one peak of the GPC curve. The component is preferably one made using a single site catalyst.

Preferred polymers for use in the practice of the invention are polymers prepared from ethylene, advantageously ethylene in combination with other monomers polymerizable therewith. Such monomers include alpha olefins and other monomers having at least one double bond. The polymer is a polyolefin, optionally a homopolymer, copolymer, or interpolymer. Preferably the homo or copolymers contain ethylene repeating units. In polyethylene copolymers, the comonomer content is preferably greater than about 1 weight percent as determined by $^{13}$C NMR (carbon 13 nuclear magnetic resonance) and more preferably greater than about 3 weight percent of any monomer copolymerizable with ethylene, preferably an alpha olefin or cyclic olefin, more preferably such an olefin of less than about 20 carbon atoms, most preferably from about 2 to about 18 carbon atoms. The comonomer content is at least one comonomer polymerizable with ethylene, preferably less than about 4 comonomers polymerizable with ethylene, more preferably less than 2 such comonomers.

The ethylene polymers are optionally any interpolymers of ethylene and at least one α-olefin. Preferred α-olefins are represented by the following formula:

in which R is a hydrocarbyl radical. R generally has from one to twenty carbon atoms. Suitable α-olefins for use as comonomers in a solution, gas phase or slurry polymerization process or combinations thereof include 1-propylene, 1-butene, 1-isobutylene, 1-pentene, 1-hexene, 4-methyl-1pentene, 1-heptene and 1-octene, as well as other monomer types such as tetrafluoroethylene, vinyl benzocyclobutane, and cycloalkenes, e.g. cyclopentene, cyclohexene, cyclooctene, and 5-ethylidene-2-norbornene (ENB). Preferably, the α-olefin will be 1-butene, 1-pentene, 4-methyl-1-pentene, 1-hexene, 1-heptene, 1-octene, or ENB, or mixtures thereof. More preferably, the α-olefin will be 1-hexene, 1-heptene, 1-octene, or mixtures thereof. Most preferably, the α-olefin is 1-octene. The ethylene polymer rheology modified according to this invention is more preferably a SLEP (defined hereinafter). These interpolymers preferably contain at least about 2 weight percent, more preferably at least about 5 weight percent, α-olefin.

Interpolymers useful in the practice of the invention optionally and in one preferred embodiment include monomers having at least two double bonds which are preferably dienes or trienes. Suitable diene and triene comonomers include 7-methyl-1,6-octadiene, 3,7-dimethyl-1,6-octadiene, 5,7-dimethyl-1,6-octadiene, 3,7,11-trimethyl-1,6,10-octatriene, 6-methyl-1,5-heptadiene, 1,3-butadiene, 1,6-heptadiene, 1,7-octadiene, 1,8-nonadiene, 1,9-decadiene, 1,10-undecadiene, bicyclo[2.2.1]hepta-2-5-diene (norbornadiene), tetracyclododecene, or mixtures thereof, preferably butadiene, hexadienes, and octadienes, most preferably 1,4-hexadiene, 4-methyl-1,4-hexadiene, 5-methyl-1,4-hexadiene, dicyclopentadiene, bicyclo[2.2.1]hepta-2–5-diene (norbornadiene) and 5-ethylidene-2-norbornene (ENB).

Polyolefins are formed by means within the skill in the art. The alpha olefin monomers and optionally other addition polymerizable monomers are polymerized under conditions within the skill in the art. Such conditions include those processes utilizing metallocene and other single site catalysts such as exemplified by U.S. Pat. No. 4,937,299 (Ewen et al.), U.S. Pat. No. 5,218,071 (Tsutsui et al.), U.S. Pat. Nos. 5,278,272, 5,324,800, 5,084,534, 5,405,922, 4,588,794, 5,204,419 and the processes subsequently discussed in more detail.

In one embodiment, starting material polyolefins are preferably substantially linear ethylene polymers (SLEPs). The substantially linear ethylene polymers (SLEPs) are homogeneous polymers having long chain branching. They are disclosed in U.S. Pat. Nos. 5,272,236 and 5,278,272, the disclosures of which are incorporated herein by reference. SLEPs are available as polymers made by the Insite™ Process and Catalyst Technology such as Engage™ polyolefin elastomers (POEs) commercially available from DuPont Dow Elastomers LLC and Affinity™ polyolefin plastomers (POPs) commercially available from The Dow Chemical Company. Specific examples of useful Engage™ POEs include SM 8400, EG 8100, and CL 8001 and specific examples of useful Affinity™ POPs include FM-1570, HM 1100, and SM 1300, each of which is commercially available from The Dow Chemical Company. SLEPs can be prepared via the solution, slurry, or gas phase, preferably solution phase, polymerization of ethylene and one or more optional α-olefin comonomers in the presence of a constrained geometry catalyst, such as the catalyst disclosed in European Patent Application 416,815-A, incorporated herein by reference.

The substantially linear ethylene/α-olefin polymers are made by a continuous process using suitable constrained geometry catalysts, preferably constrained geometry catalysts as disclosed in U.S. Pat. No. 5,132,380 and U.S. application Ser. No. 545,403, filed Jul. 3, 1990, the teachings of all of which are incorporated herein by reference. The monocyclopentadienyl transition metal olefin polymerization catalysts taught in U.S. Pat. No. 5,026,798, the teachings of which is incorporated herein by reference, are also suitable for use in preparing the polymers of the present invention, so long as the reaction conditions are as specified below.

Suitable cocatalysts for use herein include but are not limited to, for example, polymeric or oligomeric aluminoxanes, especially methyl aluminoxane, as well as inert, compatible, noncoordinating, ion forming compounds. Preferred cocatalysts are inert, noncoordinating, boron compounds.

The expression "continuous process" means a process in which reactants are continuously added and product is continuously withdrawn such that an approximation of a steady state (i.e. substantially constant concentration of reactants and product while carrying out the process) is achieved. The polymerization conditions for manufacturing the substantially linear ethylene/α-olefin polymers of the present invention are generally those useful in the solution polymerization process, although the application of the present invention is not limited thereto. Slurry and gas phase polymerization processes are also believed to be useful, provided the proper catalysts and polymerization conditions are employed.

Multiple reactor polymerization processes can also be used in making the substantially linear olefin polymers and copolymers to be Theologically modified according to the present invention, such as those disclosed in U.S. Pat. No. 3,914,342, incorporated herein by reference. The multiple reactors can be operated in series or in parallel, with at least one constrained geometry catalyst employed in one of the reactors.

The term "substantially linear" means that, in addition to the short chain branches attributable to homogeneous comonomer incorporation, the ethylene polymer is further characterized as having long chain branches in that the polymer backbone is substituted with an average of 0.01 to 3 long chain branches/1000 carbons. Preferred substantially linear polymers for use in the invention are substituted with from 0.01 long chain branch/1000 carbons to 1 long chain branch/1000 carbons, and more preferably from 0.05 long chain branch/1000 carbons to 1 long chain branch/1000 carbons.

In contrast to the term "substantially linear", the term "linear" means that the polymer lacks measurable or demonstrable long chain branches, i.e., the polymer is substituted with an average of less than 0.01 long chain branch/1000 carbons.

For ethylene/α-olefin interpolymers, "long chain branching" (LCB) means a chain length longer than the short chain branch that results from the incorporation of the α-olefin(s) into the polymer backbone. Each long chain branch has the same comonomer distribution as the polymer backbone and can be as long as the polymer backbone to which it is attached.

The empirical effect of the presence of long chain branching in the substantial linear ethylene/α-olefin interpolymers used in the invention is manifested in its enhanced Theological properties which are quantified and expressed herein in terms of gas extrusion rheometry (GER) results and/or melt flow, $I_{10}/I_2$, increases.

The presence of short chain branching of up to 6 carbon atoms in length can be determined in ethylene polymers by using $^{13}C$ nuclear magnetic resonance (NMR) spectroscopy and is quantified using the method described by Randall (Rev. Macromol. Chem. Phys., C.29, V. 2&3, p. 285–297), the disclosure of which is incorporated herein by reference.

As a practical matter, current $^{13}C$ nuclear magnetic resonance spectroscopy is difficult to distinguish the length of a long chain branch in excess of six carbon atoms. However, there are other known techniques useful for determining the presence of long chain branches in ethylene polymers, including ethylene/1-octene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G.H. and Stockmayer, W. H., J. Chem. Phys., 17,1301 (1949) and Rudin, A., *Modern Methods of Polymer Characterization*, John Wiley & Sons, New York (1991) pp. 103–112, both of which are incorporated by reference.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is a useful technique for quantifying the presence of long chain branches in SLEPs. In particular, deGroot and Chum found that the level of long chain branches in homogeneous substantially linear homopolymer samples measured using the Zimm-Stockmayer equation correlated well with the level of long chain branches measured using $^{13}$C NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers. deGroot and Chum also showed that a plot of Log ($I_2$) as a function of Log ($M_w$) as determined by GPC illustrates that the long chain branching aspects (but not the extent of long branching) of SLEPs are comparable to that of high pressure, highly branched low density polyethylene (LDPE) and are clearly distinct from ethylene polymers produced using Ziegler-type catalysts such as titanium complexes and ordinary catalysts for making homogeneous polymers such as hafnium and vanadium complexes.

SLEPs are further characterized as having:

(a) a melt flow ratio, $I_{10}/I_2 \geq 5.63$, (b) a molecular weight distribution, $M_w/M_n$ as determined by gel permeation chromatography and defined by the equation:

$$(M_w/M_n) \leq (I_{10}/I_2) - 4.63,$$

(c) a critical shear stress at the onset of gross melt fracture, as determined by gas extrusion rheometry, of greater than $4 \times 10^6$ dynes/cm$^2$ or a gas extrusion rheology such that the critical shear rate at onset of surface melt fracture for the SLEP is at least 50 percent greater than the critical shear rate at the onset of surface melt fracture for a linear ethylene polymer, the linear ethylene polymer has an $I_2$, $M_w/M_n$ and preferably density which are each within ten percent of the SLEP and wherein the respective critical shear rates of the SLEP and the linear ethylene polymer are measured at the same melt temperature using a gas extrusion rheometer, and preferably (d) a single differential scanning calorimetry, DSC, melting peak between −30 and 150 C.

For the substantially linear ethylene/α-olefin polymers used in the compositions of the invention, the $I_{10}/I_2$ ratio indicates the degree of long chain branching, i.e., the higher the $I_{10}/I_2$ ratio, the more long chain branching in the polymer. Generally, the $I_{10}/I_2$ ratio of the substantially linear ethylene/α-olefin polymers is at least about 5.63, preferably at least about 7, especially at least about 8 or above, and as high as about 25.

The melt index (as measured by ASTM D-1238 (190°/2.16 kg weight)) for the substantially linear olefin polymers useful herein is preferably at least about 0.1 grams/10 minutes (g/10 min), more preferably at least about 0.5 g/10 min and especially at least about 1 g/10 min up to preferably about 100 g/10 min, more preferably up to about 50 g/10 min, and especially up to about 20 g/10 min.

Determination of the critical shear rate and critical shear stress in regards to melt fracture as well as other rheology properties such as rheological processing index (PI), is performed using a gas extrusion rheometer (GER). The gas extrusion rheometer is described by M. Shida, R. N. Shroff and L. V. Cancio in *Polymer Engineering Science*, Vol. 17, No. 11, p. 770 (1977), and in *Rheometers for Molten Plastics* by John Dealy, published by Van Nostrand Reinhold Co. (1982) on pp. 97–99, both of which are incorporated by reference herein in their entirety. GER experiments are generally performed at a temperature of 190 C, at nitrogen pressures between 250 to 5500 psig using a 0.0754 mm diameter, 20:1 L/D die with an entrance angle of 180°. For the SLEPs described herein, the PI is the apparent viscosity (in kpoise) of a material measured by GER at an apparent shear stress of $2.15 \times 10^6$ dyne/cm$^2$. The SLEPs for use in the invention includes ethylene interpolymers and have a PI in the range of 0.01 kpoise to 50 kpoise, preferably 15 kpoise or less. The SLEPs used herein have a PI less than or equal to 70 percent of the PI of a linear ethylene polymer (either a Ziegler polymerized polymer or a linear uniformly branched polymer as described by Elston in U.S. Pat. No. 3,645,992) having an $I_2$, $M_w/M_n$ and preferably density, each within ten percent of the SLEPs.

The rheological behavior of SLEPs can also be characterized by the Dow Rheology Index (DRI), which expresses a polymer's "normalized relaxation time as the result of long chain branching." (See, S. Lai and G. W. Knight *ANTEC* '93 *Proceedings*, INSITE™ Technology Polyolefins (SLEP)—New Rules in the Structure/Rheology Relationship of Ethylene α-Olefin Copolymers, New Orleans, La., May 1993, the disclosure of which is incorporated herein by reference). DRI values range from 0 for polymers which do not have any measurable long chain branching (e.g., Tafmer™ products available from Mitsui Petrochemical Industries and Exact™ products available from Exxon Chemical Company) to about 15 and are independent of melt index. In general, for low to medium pressure ethylene polymers (particularly at lower densities) DRI provides improved correlations to melt elasticity and high shear flowability relative to correlations of the same attempted with melt flow ratios. For the SLEPs useful in this invention, DRI is preferably at least 0.1, and especially at least 0.5, and most especially at least 0.8. DRI can be calculated from the equation:

$$\text{DRI} = (3652879 * \tau_0^{1.00649}/\eta_0 - 1)/10$$

where $\tau_0$ is the characteristic relaxation time of the material and $\eta_0$ is the zero shear viscosity of the material. Both $\tau_0$ and $\eta_0$ are the "best fit" values to the Cross equation, i.e., $$\eta/\eta_0 = 1/(1 + (\gamma \cdot \tau_0)^{1-n})$$

in which n is the power law index of the material, and η and γ are the measured viscosity and shear rate, respectively. Baseline determination of viscosity and shear rate data are obtained using a Rheometric Mechanical Spectrometer (RMS-800) under dynamic sweep mode from 0.1 to 100 radians/second at 190° C. and a Gas Extrusion Rheometer (GER) at extrusion pressures from 1,000 psi to 5,000 psi (6.89 to 34.5 MPa), which corresponds to shear stress from 0.086 to 0.43 MPa, using a 0.0754 mm diameter, 20:1 L/D die at 190 C. Specific material determinations can be performed from 140 to 190° C. as required to accommodate melt index variations.

An apparent shear stress versus apparent shear rate plot is used to identify the melt fracture phenomena and quantify the critical shear rate and critical shear stress of ethylene polymers. According to Ramamurthy in the Journal of Rheology, 30(2), 337–357, 1986, the disclosure of which is incorporated herein by reference, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." Herein, as determined using the above-described GER, the onset of surface melt fracture (OSMF) is defined as the loss of extrudate gloss. The loss of extrudate gloss is the point at which the surface roughness of the extrudate can only be detected by a 40× magnification. The critical shear rate at the onset of surface melt fracture for the SLEPs is at least 50 percent greater than the critical shear rate at the onset of surface melt fracture of a linear ethylene polymer having essentially the same $I_2$ and $M_w/M_n$.

Gross melt fracture occurs at unsteady extrusion flow conditions and ranges in detail from regular (alternating rough and smooth, helical, etc.) to random distortions. For commercial acceptability to maximize the performance properties of films, coatings and moldings, surface defects should be minimal, if not absent. The critical shear stress at the onset of gross melt fracture for the SLEPs, especially those having a density >0.910 g/cc, used in the invention is greater than $4 \times 10^6$ dynes/cm². The critical shear rate at the onset of surface melt fracture (OSMF) and the onset of gross melt fracture (OGMF) will be used herein based on the changes of surface roughness and configurations of the extrudates extruded by a GER.

The SLEPs used in the invention are also preferably characterized by a single DSC melting peak. The single melting peak is determined using a differential scanning calorimeter standardized with indium and deionized water. The method involves 3–7 mg sample sizes, a "first heat" to about 180° C. which is held for 4 minutes, a cool down at 10 C/min. to −30° C. which is held for 3 minutes, and heat up at 10° C./min. to 140° C. for the "second heat". The single melting peak is taken from the "second heat" heat flow vs. temperature curve. Total heat of fusion of the polymer is calculated from the area under the curve.

For polymers having a density of 0.875 g/cc to 0.910 g/cc, the single melting peak may show, depending on equipment sensitivity, a "shoulder or a "hump" on the low melting side that constitutes less than 12 percent, typically, less than 9 percent, and more typically less than 6 percent of the total heat of fusion of the polymer. Such an artifact is observable for other linear homogeneously branched polymers such as Exact™ resins and is discerned on the basis of the slope of the single melting peak varying monotonically through the melting region of the artifact. Such an artifact occurs within 34° C., typically within 27° C., and more typically within 20° C. of the melting point of the single melting peak. The heat of fusion attributable to an artifact can be separately determined by specific integration of its associated area under the heat flow vs. temperature curve.

The molecular weight distributions of ethylene a-olefin polymers are determined by gel permeation chromatography (GPC) on a Waters 150° C. high temperature chromatographic unit equipped with a differential refractometer and three columns of mixed porosity. The columns are supplied by Polymer Laboratories and are commonly packed with pore sizes of $10^3$, $10^4$, $10^5$ and $10^6$ Å ($10^{-4}$, $10^{-3}$, $10^{-2}$ and $10^{-1}$ mm). The solvent is 1,2,4-trichlorobenzene, from which about 0.3 percent by weight solutions of the samples are prepared for injection. The flow rate is about 1.0 milliliters/minute, unit operating temperature is about 140° C. and the injection size is about 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science*, Polymer Letters, Vol. 6, p. 621, 1968) to derive the following equation:

$$M\text{polyethylene} = a*(M\text{polystyrene})^b.$$

In this equation, a=0.4316 and b=1.0. Weight average molecular weight, $M_w$, is calculated in the usual manner according to the following formula: $M_j = (\Sigma w_i(M_i^j))^i$; where $w_i$ is the weight fraction of the molecules with molecular weight $M_i$ eluting from the GPC column in fraction i and j=1 when calculating $M_w$ and j=−1 when calculating $M_n$.

The density of the linear or the substantially linear ethylene polymers (as measured in accordance with ASTM D-792) for use in the present invention is generally less than about 0.95 g/cm³. The density is preferably at least about 0.85 g/cm³ and especially at least about 0.86 g/cm³ and preferably up to about 0.94 g/cm³, more preferably up to about 0.92 g/cm³. When the modified resins are to be used for extrusion and injection molding, the density of the polymer is preferably at least 0.855 g/cm³, more preferably at least 0.865 g/cm³, and even more preferably at least 0.870 g/cm³, up to preferably 0.900 g/cm³, more preferably 0.885 g/cm³, and even more preferably up to 0.880 g/cm³. The most preferred density is determined primarily by the modulus of elasticity or flexibility desired in the molded article. The density remains substantially constant during rheology modification according to this invention.

In another embodiment, preferred polymers for starting materials in the practice of this invention are slurry high density polyethylene homopolymers preferably made using single site catalysis with a narrow MWD (preferably less than or equal to about 3.0 Mw/Mn, more preferably MWD less than about 2.5, most preferably with a density greater than about 0.945 g/ml). Preferred melt index of the starting material depends on the desired application; however, the preferred melt index for injection molding is from about 0.5 to about 50 g/10 min; for film and thermoforming applications the preferred melt index is from about 0.1 to about 20 g/10 min; and for blow molding applications, the preferred melt index is from about 0.01 to about 20 g/10 min. These polymers have a good balance of mechanical properties and processability.

The most preferred polymers as starting materials for this invention are ethylene copolymers with narrow MWD (that is a Mw/Mn of less than about 3, more preferably less than about 3.0, most preferably less than about 2.5). These can be produced using at least one C3–C20 olefin comonomer. Most preferred for copolymer is C3–C10. About 0.5–5 mole percent comonomer as determined by ASTM 5017 is preferred in the starting material. Commercially available polymers in this category are known as TAFMER polymer commercially available from Mitsui Petrochemical Industries, EXACT™ polymer commercially available from Exxon Chemical Company, AFFINITY™ polyolefin plastomer commercially available from The Dow Chemical Company, ENGAGE™ polyolefin elastomer commercially available from DuPont-Dow Elastomers, and the like. For thermoplastic applications such as film and injection molding, the most preferred comonomer content is between about 3–25 weight percent. For elastomeric applications, the preferred comonomer content is between about 20–40 weight percent. The most preferred terpolymer is an EPDM such as NORDEL™ ethylene/propylene/diene polymer commercially available from DuPont-Dow Elastomers. Other very useful starting materials include the polymers made by the processes disclosed in WO 97/43323 and WO 97/44371.

The melt index is measured according to ASTM D-1238 condition 190° C./2.16 Kg(formerly known as Condition E).

For the purposes of rheology modification or coupling, the polymer is reacted with a polyfunctional compound capable of insertion reactions into C—H bonds. Such polyfunctional compounds have at least two, preferably 2, functional groups capable of C—H insertion reactions. Those skilled in the art are familiar with C—H insertion reactions and functional groups capable of such reactions. For instance, carbenes as generated from diazo compounds, as cited in Mathur, N. C.; Snow, M. S.; Young, K. M., and Pincock, J. A.; *Tetrahedron*, (1985), 41(8), pages 1509–1516, and nitrenes as generated from azides, as cited in Abramovitch, R. A.,; Chellathurai, T.; Holcomb, W. D; McMaster, I. T.; and Vanderpool, D. P.; *J. Org. Chem.*, (1977), 42(17), 2920–6, and Abramovitch, R. A., Knaus, G. N., *J. Org. Chem.*, (1975), 40(7), 883–9.

Compounds having at least two sulfonyl azide groups (—$SO_2N_3$) capable of C—H insertion under reaction conditions are referred to herein as coupling agentso For the purpose of the invention, the poly(sulfonyl azide) is any compound having at least two sulfonyl azide groups reactive with a polyolefin under reaction conditions. Preferably the poly(sulfonyl azide)s have a structure X—R—X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the polyolefin and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's and preferably has less than about 50, more preferably less than about 30, most preferably less than about 20 carbon, oxygen or silicon atoms. Within these limits, larger is better for reasons including thermal and shock stability. When R is straight-chain alkyl hydrocarbon, there are preferably less than 4 carbon atoms between the sulfonyl azide groups to reduce the propensity of the nitrene to bend back and react with itself. Silicon containing groups include silanes and siloxanes, preferably siloxanes. The term inertly substituted refers to substitution with atoms or groups which do not undesirably interfere with the desired reaction(s) or desired properties of the resulting coupled polymers. Such groups include fluorine, aliphatic or aromatic ether, siloxane as well as sulfonyl azide groups when more than two polyolefin chains are to be joined. Suitable structures include R as aryl, alkyl, aryl alkaryl, arylalkyl silane, siloxane or heterocyclic, groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group have more than one ring, as in the case of naphthylene bis(sulfonyl azides). Poly (sulfonyl)azides include such compounds as 1,5-pentane bis(sulfonyl azide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido) biphenyl, 4,4'-diphenyl ether bis(sulfonyl azide) and bis(4-sulfonyl azidophenyl)methane, and mixtures thereof.

Sulfonyl azides are conveniently prepared by the reaction of sodium azide with the corresponding sulfonyl chloride, although oxidation of sulfonyl hydrazines with various reagents (nitrous acid, dinitrogen tetraoxide, nitrosonium tetrafluoroborate) has been used.

Polyfunctional compounds capable of insertions into C—H bonds also include carbene-forming compounds such as salts of alkyl and aryl hydrazones and diazo compounds, and nitrene-forming compounds such as alkyl and aryl azides (R—$N_3$), acyl azides (R—C(O)$N_3$), azidoformates (R—O—C(O)—N), sulfonyl azides (R—$SO_2$—$N_3$), phosphoryl azides ((RO)$_2$—(PO)—$N_3$), phosphinic azides (R$_2$—P(O)—$N_3$)and silyl azides (R$_3$—Si—$N_3$). Some of the coupling agents of the invention are preferred because of their propensity to form a greater abundance of carbon-hydrogen insertion products. Such compounds as the salts of hydrazones, diazo compounds, azidoformates, sulfonyl azides, phosphoryl azides, and silyl azides are preferred because they form stable singlet-state electron products (carbenes and nitrenes) which carry out efficient carbon-hydrogen insertion reactions, rather than substantially 1) rearranging via such mechanisms as the Curtius-type rearrangement, as is the case with acyl azides and phosphinic.azides, or 2) rapidly converting to the triplet-state electron configuration which preferentially undergoes hydrogen atom abstraction reactions, which is the case with alkyl and aryl azides. Also, selection from among the preferred coupling agents is conveniently possible because of the differences in the temperatures at which the different classes of coupling agents are converted to the active carbene or nitrene products. For example, those skilled in the art will recognize that carbenes are formed from diazo compounds efficiently at temperatures less than 100° C., while salts of hydrazones, azidoformates and the sulfonyl azide compounds react at a convenient rate at temperatures above 100° C., up to temperatures of about 200° C. (By convenient rates it is meant that the compounds react at a rate that is fast enough to make commercial processing possible, while reacting slowly enough to allow adequate mixing and compounding to result in a final product with the coupling agent adequately dispersed and located substantially in the desired position in the final product. Such location and dispersion may be different from product to product depending on the desired properties of the final product.) Phosphoryl azides may be reacted at temperatures in excess of 180° C. up to about 300° C., while silyl azides react preferentially at temperatures of from about 250° C., to 400° C.

To modify rheology, also referred to herein as "to couple," the poly(sulfonyl azide) is used in a rheology modifying amount, that is an amount effective to increase the low-shear viscosity (at 0.1 rad/sec) of the polymer preferably at least about 5 percent as compared with the starting material polymer, but less than a crosslinking amount, that is an amount sufficient to result in at least about 10 weight percent gel as measured by ASTM D2765-procedure A. While those skilled in the art will recognize that the amount of azide sufficient to increase the low shear viscosity and result in less than about 10 weight percent gel will depend on molecular weight of the azide used and polymer the amount is preferably less than about 5 percent, more preferably less than about 2 percent, most preferably less than about 1 weight percent poly(sulfonyl azide) based on total weight of polymer when the poly(sulfonyl azide) has a molecular weight of from about 200 to about 2000. To achieve measurable rheology modification, the amount of poly(sulfonyl azide) is preferably at least about 0.01 weight percent, more preferably at least about 0.05 weight percent, most preferably at least about 0.10 weight percent based on total polymer.

For rheology modification, the sulfonyl azide is admixed with the polymer and heated to at least the decomposition temperature of the sulfonyl azide. By decomposition temperature of the azide it is meant that temperature at which the azide converts to the sulfonyl nitrene, eliminating nitrogen and heat in the process, as determined by differential scanning calorimetry (DSC). The poly(sulfonyl azide)begins to react at a kinetically significant rate (convenient for use in the practice of the invention) at temperatures of about 130° C. and is almost completely reacted at about 160° C. in a DSC (scanning at 10° C./min). Accelerated Rate Calorimetry (ARC) (scanning at 2° C./hr) shows onset of decomposition is about 100° C. Extent of reaction is a function of time and temperature. At the low levels of azide used in the practice of the invention, the optimal properties are not reached until the azide is essentially fully reacted. Temperatures for use in the practice of the invention are also determined by the softening or melt temperatures of the polymer starting materials. For these reasons, the temperature is advantageously greater than about 90° C., preferably greater than about 120° C., more preferably greater than about 150° C., most preferably greater than 180° C.

Preferred times at the desired decomposition temperatures are times that are sufficient to result in reaction of the coupling agent with the polymer(s) without undesirable thermal degradation of the polymer matrix. Preferred reaction times in terms of the half life of the coupling agent, that is the time required for about half of the agent to be reacted at a preselected temperature, which half life is determinable by DSC is about 5 half lives of the coupling agent. In the case of a bis(sulfonyl azide), for instance, the reaction time is preferably at least about 4 minutes at 200° C.

Admixing of the polymer and coupling agent is conveniently accomplished by any means within the skill in the art. Desired distribution is different in many cases, depending on what rheological properties are to be modified. In a homopolymer it is desirable to have as homogeneous a distribution as possible, preferably achieving solubility of the azide in the polymer melt. In a blend it is desirable to have low solubility in one or more of the polymer matrices such that the azide is preferentially in one or the other phase, or predominantly in the interfacial region between the two phases Preferred processes include at least one of (a) dry blending the coupling agent with the polymer, preferably to form a substantially uniform admixture and adding this mixture to melt processing equipment, e.g. a melt extruder to achieve the coupling reaction, at a temperature at least the decomposition temperature of the coupling agent; (b) introducing, e.g. by injection, a coupling agent in liquid form, e.g. dissolved in a solvent therefor or in a slurry of coupling agent in a liquid, into a device containing polymer, preferably softened, molten or melted polymer, but alternatively in particulate form, in solution or dispersion, more preferably in melt processing equipment; (c) forming a first admixture of a first amount of a first polymer and a coupling agent, advantageously at a temperature less than about the decomposition temperature of the coupling agent, preferably by melt blending, and then forming a second admixture of the first admixture with a second amount of a second polymer (for example a concentrate of a coupling agent admixed with at least one polymer and optionally other additives, is conveniently admixed into a second polymer or combination thereof optionally with other additives, to modify the second polymer(s)); (d) feeding at least one coupling agent, preferably in solid form, more preferably finely comminuted, e.g. powder, directly into softened or molten polymer, e.g. in melt processing equipment, e.g. in an extruder; or combinations thereof. Among processes (a) through (d), processes (b) and (c) are preferred, with (c) most preferred. For example, process (c) is conveniently used to make a concentrate with a first polymer composition having a lower melting temperature, advantageously at a temperature below the decomposition temperature of the coupling agent, and the concentrate is melt blended into a second polymer composition having a higher melting temperature to complete the coupling reaction. Concentrates are especially preferred when temperatures are sufficiently high to result in loss of coupling agent by evaporation or decomposition not leading to reaction with the polymer, or other conditions would result that effect. Alternatively, some coupling occurs during the blending of the first polymer and coupling agent, but some of the coupling agent remains unreacted until the concentrate is blended into the second polymer composition. Each polymer or polymer composition includes at least one homopolymer, copolymer, terpolymer, or interpolymer and optionally includes additives within the skill in the art. When the coupling agent is added in a dry form it is preferred to mix the agent and polymer in a softened or molten state below the decomposition temperature of the coupling agent then to heat the resulting admixture to a temperature at least equal to the decomposition temperature of the coupling agent.

The term "melt processing" is used to mean any process in which the polymer is softened or melted, such as extrusion, pelletizing, molding, thermoforming, film blowing, compounding in polymer melt form, fiber spinning, and the like.

The polyolefin(s) and coupling agent are suitably combined in any manner which results in desired reaction thereof, preferably by mixing the coupling agent with the polymer(s) under conditions which allow sufficient mixing before reaction to avoid uneven amounts of localized reaction then subjecting the resulting admixture to heat sufficient for reaction. Preferably, a substantially uniform admixture of coupling agent and polymer is formed before exposure to conditions in which chain coupling takes place. A substantially uniform admixture is one in which the distribution of coupling agent in the polymer is sufficiently homogeneous to be evidenced by a polymer having a melt viscosity after treatment according to the practice of the invention at least one of (a) higher at low angular frequency (e.g. 0.1 rad/sec) or (b) lower at higher angular frequency (e.g. 100 rad/sec) than that of the same polymer which has not been treated with the coupling agent but has been subjected to the same shear and thermal history. Thus, preferably, in the practice of the invention, decomposition of the coupling agent occurs after mixing sufficient to result in a substantially uniform admixture of coupling agent and polymer. This mixing is preferably attained with the polymer in a molten or melted state, that is above the crystalline melt temperature, or in a dissolved or finely dispersed condition rather than in a solid mass or particulate form. The molten or melted form is more preferred to insure homogeneity rather than localized concentrations at the surface.

Any equipment is suitably used, preferably equipment which provides sufficient mixing and temperature control in the same equipment, but advantageously practice of the invention takes place in such devices as an extruder or a static polymer mixing devise such as a Brabender blender. The term extruder is used for its broadest meaning to include such devices as a device which extrudes pellets or pelletizer. Conveniently, when there is a melt extrusion step between production of the polymer and its use, at least one step of the process of the invention takes place in the melt extrusion step. While it is within the scope of the invention that the reaction take place in a solvent or other medium, it is preferred that the reaction be in a bulk phase to avoid later steps for removal of the solvent or other medium. For this purpose, a polymer above the crystalline melt temperature is advantageous for even mixing and for reaching a reaction temperature (the decomposition temperature of the sulfonyl azide).

In a preferred embodiment the process of the present invention takes place in a single vessel, that is mixing of the coupling agent and polymer takes place in the same vessel as heating to the decomposition temperature of the coupling agent. The vessel is preferably a twin-screw extruder, but is also advantageously a single-screw extruder, a batch mixer, or a static mixing zone for mixing polymer at the back end of a production process. The reaction vessel more preferably has at least two zones of different temperatures into which a reaction mixture would pass, the first zone advantageously being at a temperature at least the crystalline melt temperature or the softening temperature of the polymer(s) and preferably less than the decomposition temperature of the coupling agents and the second zone being at a temperature sufficient for decomposition of the coupling agent. The first zone is preferably at a temperature sufficiently high to soften the polymer and allow it to combine with the coupling agent through distributive mixing to a substantially uniform admixture.

For polymers that have softening points above the coupling agent decomposition temperature (preferably greater than 200° C.), and especially when incorporation of a lower melting polymer (such as in a concentrate) is undesirable, the preferred embodiment for incorporation of coupling agent is to solution blend the coupling agent in solution or admixture into the polymer, to allow the polymer to imbibe (absorb or adsorb at least some of the coupling agent), and then to evaporate the solvent. After evaporation, the resulting mixture is extruded. The solvent is preferably a solvent for the coupling agent, and more preferably also for the polymer when the polymer is soluble such as in the case of polycarbonate. Such solvents include polar solvents such as acetone, THF (tetrahydrofuran) and chlorinated hydrocarbons such as methylene chloride. Alternatively other non-polar compounds such as mineral oils in which the coupling agent is sufficiently miscible to disperse the coupling agent in a polymer, are used.

To avoid the extra step and resultant cost of re-extrusion and to insure that the coupling agent is well blended into the polymer, in alternative preferred embodiments it is preferred that the coupling agent be added to the post-reactor area of a polymer processing plant. For example, in a slurry process of producing polyethylene, the coupling agent is added in either powder or liquid form to the powdered polyethylene after the solvent is removed by decantation and prior to the drying and densification extrusion process. In an alternative embodiment, when polymers are prepared, in a gas phase process, the coupling agent is preferably added in either powder or liquid form to the powdered polyethylene before the densification extrusion. In an alternative embodiment when a polymer is made in a solution process, the coupling agent is preferably added to the polymer melt stream after devolatilization and before the pelletizing extrusion process.

Practice of the process of the invention to rheology modify polymers yields rheology modified or chain coupled polymers, that is the polymers which have sulfonamide, amine, alkyl-substituted or aryl-substituted carboxamide, alkyl-substituted or aryl-substituted phosphoramide, alkyl-substituted or aryl-substituted methylene coupling between different polymer chains. Resulting compounds advantageously show higher low shear viscosity than the original polymer due to coupling of long polymer chains to polymer backbones. Broad molecular weight monomodal distribution polymers (MWD of 3.0 and greater) and gel levels less than 10 percent as determined by xylene extraction show less improvement than the dramatic effect noted in narrow MWD polymer (e.g. MWD=about 2.0) with gel less than 10 percent as determined by xylene extraction. Alternatively, those skilled in the art will recognize that it is possible to prepare polymers with broader polydispersity (e.g. MWD greater than about 2.0) by blending polymers of low polydispersity, either by post-reactor compounding, or by preparing the polymers in a multi-reactor configuration wherein the conditions of each reactor are controlled to provide a polymer with the desired molecular weight and MWD for each specific component resin of the final product.

Rheology modification leads to polymers which have controlled rheological properties, specifically improved melt strength as evidenced by increased low shear viscosity, better ability to hold oil, improved scratch and mar resistance, improved tackiness, improved green strength (melt), higher orientation in high shear and high extensional processes such as injection molding, film extrusion (blown and cast), calendaring, rotomolding, fiber production, profile extrusion, foams, and wire and cable insulation as measured by tan delta as described hereinafter, elasticity by viscosity at 0.1 rad/sec and 100 rad/sec, respectively. It is also believed that this process can be used to produce dispersions having improved properties of higher low shear viscosity than the unmodified polymer as measured by Dynamic Mechanical Spectroscopy (DMS).

Rheology modified polymers are useful as large blow molded articles due to the higher low shear viscosity than unmodified polymer and the maintenance of the high shear viscosity for processability as indicated by high shear viscosity, foams for stable cell structure as measured by low shear viscosity, blown film for better bubble stability as measured by low shear viscosity, fibers for better spinnability as measured by high shear viscosity, cable and wire insulation for green strength to avoid sagging or deformation of the polymer on the wire as measured by low shear viscosity which are aspects of the invention.

Polymers rheology modified according to the practice of the invention are superior to the corresponding unmodified polymer starting materials for these applications due to the elevation of viscosity, of preferably at least about 5 percent at low shear rates (0.1 rad/sec), sufficiently high melt strengths to avoid deformation during thermal processing (e.g. to avoid sag during thermoforming) or to achieve bubble strength during blow molding, and sufficiently low high shear rate viscosities to facilitate molding and extrusion. These rheological attributes enable faster filling of injection molds at high rates than the unmodified starting materials, the setup of foams (stable cell structure) as indicated by formation of lower density closed cell foam, preferably with higher tensile strength, insulation properties, and/or compression set than attained in the use of coupling or rheology modification using coupling agents which generate free radicals, because of high melt viscosity. Advantageously toughness and tensile strength of the starting material is maintained.

Polymers resulting from the practice of the invention are different from those resulting from practice of prior art processes as shown in CA 797,917. The polymers of the present invention show improved melt elasticity, that is higher tan delta as measured by DMS, better drawability, that is higher melt strength as measured by melt tension, less swelling as measured by blow molding die swell, and less shrinkage as measured by mold shrinkage than the unmodified polymer and the broad MWD (greater than about 3.0 Mw/Mn)counterpart in thermoforming and large part blow molding.

There are many types of molding operations which can be used to form useful fabricated articles or parts from the formulations disclosed herein, including various injection molding processes (e.g., that described in *Modern Plastics Encyclopedia*/89, Mid October 1988 Issue, Volume 65, Number 11, pp. 264–268, "Introduction to Injection Molding" and on pp. 270–271, "Injection Molding Thermoplastics", the disclosures of which are incorporated herein by reference) and blow molding processes (e.g., that described in *Modern Plastics Encyclopedia*/89, Mid October 1988 Issue, Volume 65, Number 11, pp. 217–218, "Extrusion-Blow Molding", the disclosure of which is incorporated herein by reference), profile extrusion, calendering, pultrusion and the like.

The rheology-modified ethylene polymers, processes for making them, and intermediates for making them of this invention are useful in the automotive area, industrial goods, building and construction, electrical (e.g., wire and cable coatings/insulation) and tire products. Some of the fabricated articles include automotive hoses, single ply roofing, and wire and cable voltage insulation and jackets.

Film and film structures particularly benefit from this invention and can be made using conventional hot blown film fabrication techniques or other biaxial orientation processes such as tenter frames or double bubble processes. Conventional hot blown film processes are described, for example, in *The Encyclopedia of Chemical Technology*, Kirk-Othmer, Third Edition, John Wiley & Sons, New York, 1981, vol. 16, pp. 416–417 and Vol. 18, pp. 191–192. Biaxial orientation film manufacturing process such as described in a "double bubble" process as in U.S. Pat. No. 3,456,044 (Pahlke), and the processes described in U.S. Pat. No. 4,352,849 (Mueller), U.S. Pat. No. 4,597,920 (Golike), U.S. Pat. No. 4,820,557 (Warren), U.S. Pat. No. 4,837,084 (Warren), U.S. Pat. No. 4,865,902 (Golike et al.), U.S. Pat. No. 4,927,708 (Herran et al.), U.S. Pat. No. 4,952,451 (Mueller), U.S. Pat. No. 4,963,419 (Lustig et al.), and U.S. Pat. No. 5,059,481 (Lustig et al.), can also be used to make film structures from the novel compositions described herein. The film structures can also be made as described in a tenter-frame technique, such as that used for oriented polypropylene.

Other multi-layer film manufacturing techniques for food packaging applications are described in *Packaging Foods With Plastics*, by Wilmer A. Jenkins and James P. Harrington (1991), pp. 19–27, and in "Coextrusion Basics" by Thomas I. Butler, *Film Extrusion Manual: Process, Materials, Properties* pp. 31–80 (published by the TAPPI Press (1992)).

The films may be monolayer or multilayer films. The film made using this invention can also be coextruded with the other layer(s) or the film can be laminated onto another layer(s) in a secondary operation, such as that described in *Packaging Foods With Plastics*, by Wilmer A. Jenkins and James P. Harrington (1991) or that described in "Coextrusion For Barrier Packaging" by W. J. Schrenk and C. R. Finch, *Society of Plastics Engineers RETEC Proceedings*, June 15–17 (1981), pp. 211–229. If a monolayer film is produced via tubular film (i.e., blown film techniques) or flat die (i.e., cast film) as described by K. R. Osborn and W. A. Jenkins in "Plastic Films, Technology and Packaging Applications" (Technomic Publishing Co., Inc., 1992), the disclosure of which is incorporated herein by reference, then the film must go through an additional post-extrusion step of adhesive or extrusion lamination to other packaging material layers to form a multilayer structure. If the film is a coextrusion of two or more layers (also described by Osborn and Jenkins), the film may still be laminated to additional layers of packaging materials, depending on the other physical requirements of the final film. "Laminations vs. Coextrusion" by D. Dumbleton (Converting Magazine (September 1992), also discusses lamination versus coextrusion. Monolayer and coextruded films can also go through other post extrusion techniques, such as a biaxial orientation process.

Extrusion coating is yet another technique for producing multilayer film structures using the novel compositions described herein. The novel compositions comprise at least one layer of the film structure. Similar to cast film, extrusion coating is a flat die technique. A sealant can be extrusion coated onto a substrate either in the form of a monolayer or a coextruded extrudate.

Generally for a multilayer film structure, the novel compositions described herein comprise at least one layer of the total multilayer film structure. Other layers of the multilayer structure include but are not limited to barrier layers, and/or tie layers, and/or structural layers. Various materials can be used for these layers, with some of them being used as more than one layer in the same film structure. Some of these materials include: foil, nylon, ethylene/vinyl alcohol (EVOH) copolymers, polyvinylidene chloride (PVDC), polyethylene terephthalate (PET), oriented polypropylene (OPP), ethylene/vinyl acetate (EVA) copolymers, ethylene/acrylic acid (EAA) copolymers, ethylene/methacrylic acid (EMAA) copolymers, LLDPE, HDPE, LDPE, nylon, graft adhesive polymers (e.g., maleic anhydride grafted polyethylene), and paper. Generally, the multilayer film structures comprise from 2 to 7 layers.

Such articles comprising the rheology-modified polymer of this invention may be made by melt processing the rheology-modified polymer according to this invention. That process may include processing pellets or granules of polymer which have been rheology-modified according to this invention. In a preferred embodiment, the pellets or granules are substantially free of unreacted coupling agent when the coupling agent comprises a heat-activated coupling agent.

Such articles may also be made by melt processing an intermediate comprising a homogeneous polymer which is not substantially free of unreacted coupling agent. Such intermediates are preferably treated with a coupling agent, but are not subjected to subsequent melt processing until the polymer is melted to make the article. The coupling agent may be either radiation or a heat-activated crosslinking agent.

The rheology-modified polymers and intermediates used to make rheology-modified polymers may be used alone or in combination with one or more additional polymers in a polymer blend. When additional polymers are present, they may be selected from any of the modified or unmodified homogeneous polymers described above for this invention and/or any modified or unmodified heterogeneous polymers.

Heterogeneous polyethylenes that are optionally combined with the rheology-modified polymers according to this invention fall into two broad categories, those prepared with a free radical initiator at high temperature and high pressure, and those prepared with a coordination catalyst at high temperature and relatively low pressure. The former are generally known as low density polyethylenes (LDPE) and are characterized by branched chains of polymerized monomer units pendant from the polymer backbone. LDPE polymers generally have a density between about 0.910 and 0.935 g/cc. Ethylene polymers and copolymers prepared by the use of a coordination catalyst, such as a Ziegler or Phillips catalyst, are generally known as linear polymers because of the substantial absence of branch chains of polymerized monomer units pendant from the backbone. High density polyethylene (HDPE), generally having a density of about 0.941 to about 0.965 g/cc, is typically a homopolymer of ethylene, and it contains relatively few branch chains relative to the various linear copolymers of ethylene and an α-olefin. HDPE is well known, commercially available in various grades, and may be used in this invention. Density is measured according to the procedure of ASTM D-792.

Linear copolymers of ethylene and at least one α-olefin of 3 to 12 carbon atoms, preferably of 4 to 8 carbon atoms, are also well known and commercially available. As is well known in the art, the density of a linear ethylene/α-olefin copolymer is a function of both the length of the α-olefin and the amount of such monomer in the copolymer relative to the amount of ethylene, the greater the length of the α-olefin and the greater the amount of α-olefin present, the lower the density of the copolymer. Linear low density polyethylene (LLDPE) is typically a copolymer of ethylene and an α-olefin of 3 to 12 carbon atoms, preferably 4 to 8 carbon atoms (e.g., 1-butene, 1-octene, etc.), that has sufficient α-olefin content to reduce the density of the copolymer to that of LDPE. When the copolymer contains even more α-olefin, the density will drop below about 0.91 g/cc and these copolymers are known as ultra low density polyethylene (ULDPE) or very low density polyethylene (VLDPE). The densities of these linear polymers generally range from about 0.87 to 0.91 g/cc.

Both the materials made by the free radical catalysts and by the coordination catalysts are well known in the art, as are their methods of preparation. Heterogeneous linear ethylene polymers are available from The Dow Chemical Company as Dowlex™ LLDPE and as Attane™ ULDPE resins. Heterogeneous linear ethylene polymers can be prepared via the solution, slurry or gas phase polymerization of ethylene and one or more optional α-olefin comonomers in the presence of a Ziegler Natta catalyst, by processes such as are disclosed in U.S. Pat. No. 4,076,698 to Anderson et al., which is incorporated herein by reference. Preferably, heterogeneous ethylene polymers are typically characterized as having molecular weight distributions, $M_w/M_n$, in the range of from 3.5 to 4.1. Relevant discussions of both of these classes of materials, and their methods of preparation are found in U.S. Pat. No. 4,950,541 and the patents to which it refers, all of which are incorporated herein by reference.

Compositions of the invention and compositions produced by practice of the invention are particularly useful because of their surprising properties. For instance the preferred medium density polyethylenes and ethylene copolymers (density about 0.90 g/mL, comonomer content 0.5–5 mole percent) of the invention are particularly useful as blown films such as in trash bags, grocery sacks, sealant layers, tie layers, produce bags, garment bags, shipping sacks, medical films, stretch film, shrink film, agricultural film, construction film, geomembranes, stretch hooders, and the like, preferably trash bags, agricultural film, construction film, and geomembranes. Similarly the medium density preferred embodiments are useful in cast films such as are useful in stretch films, diaper backsheets, industrial wrap, produce wrap, meat wrap, consumer wrap, shrink film, elastic film and the like, preferably as elastic film. The high density polyethylene (density greater than about 0.945 g/mL and preferably MWD less than or equal to about 3.0 preferred embodiments are particularly useful for thermoforming, preferably for use in refrigerator liners, thin walled containers, medical blister packs, modified atmosphere packaging; and in blow molding (including extrusion blow molding) to form such articles as oil bottles, pipe, fuel tanks including fuel filler necks, milk jugs, and trigger bottles. The low density ethylene copolymer preferred embodiments (density less than about 0.89 g/mL and comonomer content preferably about 5–25 mole percent) are particularly useful in extrusion such as to form wire and cable coatings, tubing, profiles such as gaskets and seals, sheeting, extrusion coatings such as carpet backing, multilayer packaging, tougheners, and impact modifiers for blends of polymers, preferably for wire and cable coating, tougheners and impact modifiers. The low density preferred embodiments are also particularly useful for calendaring to form such materials as sheeting, packaging films, and non-packaging films; for foams particularly cushion packaging, toys, building and construction uses, automotive uses, body boards, airline seats, floral and craft uses, preferably cushion packaging, building and construction, automotive uses, and body boards; and for adhesives and sealants, particularly hot melt adhesives, pressure sensitive adhesives (whether applied in solvents or by hot melt), caulks, and as tackifiers in other compositions.

Practice of the present invention increases the utility of ethylene polymers, particularly high density polyethylene, and propylene polymers in the automotive field. With increased melt strength it becomes possible to produce such automotive articles as fascia, bumper energy absorbers, bumper beams, door trim panels, door hardware cartridges, seat backs, seat pans, head rest cores, header trim, header energy absorbing (EA) inserts, pillars, instrument panels, instrument panel trim, bolsters, glove boxes, doors, consoles, ducts, parcel shelves, hat shelves, load floors, rocker panels, fenders and combinations thereof using such means as blow molding, injection molding, thermoforming, and gas assisted injection molding. Furthermore, such automotive articles as cross car supports, door outer panels, seat trim, and combinations thereof can be produced using such means as blow molding, injection molding, and thermoforming. Such articles as roof liners, underbody closeouts (underbody shields), pick-up bed liners, and wheel liners can be conveniently produced by thermoforming; while such articles as fuel filler necks and fuel tanks can be produced using blow molding, roto-molding or injection molding. Injection molding, thermoforming and gas assisted injection molding are useful for producing door impact beams. Such articles as bumper beams, door impact beams, heater trim, roof liners, ducts, pick-up bed liners, fuel filler necks, fuel transport lines and conductive fuel systems are conveniently produced by extrusion or coextrusion as well. Coextrusion is additionally useful for rocker panels and fenders. Conductive fuel systems are also optionally roto-molded or blow molded. Roto-molding is also useful for door EA inserts, seat backs, head rest cores, header EA, instrument panel trim, bolsters, and ducts; while blow molding is additionally useful for door EA inserts. Furthermore, foaming is useful for bumper energy absorbers, bumper beams, door trim panels, door EA inserts, seat trim, head rest cores, header trim, roof liners, header EA, pillars, instrument panel trim, bolsters, and pick-up bed liners. Compression thermoforming, that is thermoforming at a pressure greater than 240 kPa, is useful to produce such articles as bumper beams, cross car supports, door impact beams, door outer panels, door hardware cartridges, seat backs, seat pans, header trim, roof liners, instrument panel trim, bolsters, ducts, parcel shelves, hat shelves, load floors, rocker panels, fenders, underbody closeouts, pick-up bed liners, wheel liners and combinations thereof. Practice of the invention advantageously facilitates blow molding, thermoforming and foaming ethylene polymers and propylene polymers that without reaction with poly(sulfonyl azide) would not be conveniently shaped using those methods and which have a fractional melt (as measured by the procedure of ASTM-D1238 using 5 kg weight and 109° C.) at least one order of magnitude lower than starting material before coupling.

The following examples are to illustrate this invention and do not limit it. Ratios, parts, and percentages are by weight unless otherwise stated. Examples (Ex) of the invention are designated numerically while comparative samples (C.S.) are designated alphabetically and are not examples of the invention.

Test Methods:

A Rheometrics, Inc. RMS-800 dynamic mechanical spectrometer with 25 mm diameter parallel plates was used to determine the dynamic Theological data. A frequency sweep with five logarithmically spaced points per decade was run from 0.1 to 100 rad/s at 190° C. The strain was determined to be within the linear viscoelastic regime by performing a strain sweep at 0.1 rad/s and 190° C., by strain sweep from 2 to 30 percent strain in 2 percent steps to determine the minimum required strain to produce torques within the specification of the transducer; another strain sweep at 100 rad/s and 190° C. was used to determine the maximum strain before nonlinearity occurred according to the procedure disclosed by J. M. Dealy and K. F. Wissbrun, "Melt Rheology and Its Role in Plastics Processing", van Nostrand, New York (1990). All testing was performed in a nitrogen purge to minimize oxidative degradation.

A Perkin Elmer model TMA 7 thermomechanical analyzer was used to measure the upper service temperature. Probe force of 102 g and heating rate of 5° C./min were used. Each test specimen was a disk with thickness of about 2 mm and diameter, prepared by compression molding at 205° C. and air-cooling to room temperature. Xylene Extraction is performed by weighing out 1 gram samples of polymer. The samples are transferred to a mesh basket which is then placed in boiling xylene for 12 hours. After 12 hours, the sample baskets are removed and placed in a vacuum oven at 150° C. and 28 in. of Hg vacuum for 12 hours. After 12 hours, the samples are removed, allowed to cool to room temperature over a 1 hour period, and then weighed. The results are reported as percent polymer extracted. Percent extracted=(initial weight-final weight)/initial weight according to ASTM D-2765 Procedure "A".

Samples are prepared using either a mixer commercially available from Haake, Inc. under the trade designation HaakeBuchler Rheomix 600 mixer with roller style blades, attached to a rheometer commercially available from Haake, Inc. under the trade designation HaakeBuchler Rheocord 9000 Torque rheometer, or using a Brabender mixer (Type R.E.E. No. A-19/S.B) with a 50 g mixing bowl.

All instruments were used according to manufacturer's directions.

EXAMPLES 1 AND 2 AND COMPARATIVE SAMPLE A

A 43 g samples of an ethylene-octene (6 mole percent octene, estimate based on equation from Kale et al in *Journal of Plastic Film and Sheeting*, vol. 12, January 1996, pp. 27–40) substantially linear homogeneous copolymer with Mw/Mn=2.19 and Mw=93,600, 1 melt index (MI), density 0.903 g/cc commercially available from The Dow Chemical Company under the trade designation AFFINITY PL 1880 (containing about 500 ppm of a hindered polyphenol antioxidant commercially available from Ciba Geigy Corporation under the trade designation Irganox 1076 and 800 ppm of an antioxidant believed to be tetrakis-(2,4-ditetitiary butyl-phenol)-4,4'-biphenyl phosphonite commercially available from Sandoz Chemical Company under the trade designation P-EPQ) was mixed in a Haake mixer. The polymer was melted at 100° C. for 2 minutes until all pellets were molten. Then 0.05 weight percent of 4,4'-oxybis (benzenesulfonyl azide) (Hereinafter BSA) CAS# [7456-68-0] was mixed into the molten polymer for 2 minutes. After intimate mixing was achieved, the temperature was adjusted to 170° C. and the rotational speed was increased from 20 to 40 rpm over a period of 7 minutes to reach a maximum of 180° C. The mixture is held at this higher temperature and high rotational speed for 12 minutes, and then it was cooled to 150° C. The sample was removed from the Haake and allowed to cool to room temperature.

For Example 2 the procedure of Example 1 was repeated but using 0.1 weight percent 4,4'-oxybis(benzenesulfonyl azide) (BSA).

Rheological properties (viscosity and tan delta) were measured for each sample plus an unmodified control (comparative Sample A) at 190° C. over a frequency range of 0.1 to 100 rad/second using a Rheometrics mechanical spectrometer equipped with parallel 25 mm diameter plates according to manufactures directions. The low shear viscosity is the viscosity measured at the lowest frequency. The high shear viscosity was determined NSC at 100 rad/sec.

The results of these tests are in Table 1.

EXAMPLES 3 AND 4 AND COMPARATIVE SAMPLE B

The procedure of Example 1 is repeated using an 6.6 mole percent comonomer ethylene-butene linear homogeneous copolymer with Mw/Mn=1.9 and Mw=118,600 MI=1.2, density 0.9021, melt flow 1.20 g/10 min at 190° C., melting temperature 197.6° F. (92° C.). commercially available from Exxon Chemical Company under the trade designation EXACT 3028 reported to be made using a metallocene catalyst, using 0.05 weight percent of BSA for Example 3, 0.1 weight percent for Example 4 and no poly(sulfonyl azide) for Comparative Samples B.

EXAMPLES 5 AND 6 AND COMPARATIVE SAMPLE C

The following is an example of using a multimodal polymer with an overall MWD>3.00, but for which at least one component of the product has a MWD<3.0 and is reported to be made using a metallocene catalyst.

The procedure of Example 1 is repeated using an ethylene (69 weight percent) propylene (30.5 weight percent) diene (0.5 weight percent)terpolymer with specific gravity 0.88, Mooney viscosity 20 (by ASTM D 1646) Mw/Mn=3.5 and Mw=146,200 commercially available from DuPont Dow Elastomers LLC under the trade designation Nordel IP NDR 3720 hydrocarbon rubber (containing 1000 ppm Irganox 1076 stabilizer) and using 0.05 weight percent of BSA for Example 5, 0.1 weight percent of BSA for Example 6 and no poly(sulfonyl azide) for Comparative Samples C.

COMPARATIVE SAMPLES D, E AND F

The procedure of Example 1 is repeated using an ethylene (72 weight percent) propylene (22 weight percent) diene (6 weight percent)terpolymer with specific gravity 0.87, at 22.4° C., Mw/Mn=3.65 and Mw=115,200, Mooney viscosity 20, commercially available from DuPont Dow Elastomers LCC under the trade designation Nordel 2722 hydrocarbon rubber (reported to be made using a Ziegler Natta catalyst) with 0.0 weight percent BSA for C.S. D, 0.05 weight percent of BSA for C.S. E, and 0.1 weight percent of BSA for C.S. F.

COMPARATIVE SAMPLES G, H, AND I

The procedure of Example 1 is repeated using an ethylene (71 weight percent), propylene (23 weight percent), diene (6 weight percent)terpolymer with Mw/Mn=2.98 and Mw=173,200, Mooney viscosity 45±6 by ASTM D 1646, commercially available from DuPont Dow Elastomers under the trade designation Nordel 2744 hydrocarbon rubber (reported to be made using a Ziegler Natta catalyst) with 0.0, 0.05, and 0.10 weight percent of BSA for C.S. G, C.S. H, and C.S. I, respectively.

EXAMPLES 7 AND 8 AND COMPARATIVE SAMPLE J

The procedure of Example 1 is repeated using a substantially linear ethylene/octene copolymer with $I_2$=1 g/10 minutes and density of 0.870 g/cm$^3$, Mw=111,400 and Mw/Mn=2.062, commercially available from DuPont Dow Elastomers LLC under the trade designation ENGAGE EG8100 (reported to be made using a constrained geometry catalyst) with 0, 0.05, and 0.1 weight percent of BSA for C.S. J, Example 7, and Example 8, respectively.

EXAMPLES 9 AND 10 AND COMPARATIVE SAMPLE K

The procedure of Example 1 is repeated using a linear ethylene-propylene copolymer with Mw/Mn 2.02, Mw=122,000 $I_2$=1.1 g/10 minutes and density of 0.87 g/cm$^3$, Mw=116,000 and Mw/Mn=1.898, commercially available from Mitsui Petrochemical Industries under the trade designation Tafmer P0480 with 0, 0.05, and 0.1 weight percent of BSA for C.S. K, Example 9, and Example 10, respectively.

COMPARATIVE SAMPLES L, M AND N

The procedure of Example 1 is repeated using a linear low density ethylene/octene copolymer (2.5 mole percent octene, estimated based on equation from Kale et al. *J. Plastic Film Sheeting*, vol. 12, p. 27–40, January 1996) with Mw/Mn=3.96, Mw=114,800 $I_2$=1.0 g/10 minutes and density of 0.92 g/cm$^3$.commercially available from The Dow Chemical Company under the trade designation Dowlex 2045 (containing 1250 ppm calcium stearate, 200 ppm hindered polyphenol antioxidant commercially available from Ciba Geigy Corporation under the trade designation Irganox 1010) with 0.0, 0.05 and 0.10 weight percent of BSA for C.S. L, C.S. M, and C.S. N, respectively.

EXAMPLES 11 AND 12 AND COMPARATIVE SAMPLE

The following is an example of rheology modification of a multimodal polymer product with an overall MWD>3.0, but for which at least one of the components has a MWD<3.0 and is reported to be made using a metallocene catalyst. The procedure of Example 1 is repeated using an ethylene-octene copolymer with melt index of 0.85 g/10 min (by ASTM D1238, 190° C./2.16 kg), density 0.920 g/cc (by ASTM D 792), Mw/Mn=3.45 and Mw=130,300, commercially available from The Dow Chemical Company under the trade designation Elite 5100 (containing 1250 ppm calcium stearate, 500 ppm Irganox 1076 antioxidant, and 800 ppm P-EPQ antioxidant) with 0, 0.05, and 0.1 weight percent of BSA for C.S. P, Example 11, and Example 12, respectively.

EXAMPLE 13 AND COMPARATIVE SAMPLE

The procedure of Example 1 is repeated using an ethylene-octene copolymer with melt index of 1.0 g/10 min (by ASTM D1238, 190° C./2.16 kg), density 0.909 g/cc (by ASTM D 792), Mw/Mn=2.265 and Mw=86,100, commercially available from The Dow Chemical Company under the trade designation Affinity PL 1840, containing about 750 ppm by weight octadecyl 3,5-di-tert-butyl-4-hydroxyhydrocinnamate, CAS# 002082-79-3 and about 1200 ppm of a mixture of tetrakis(2,4-di-tert-butyl-phenyl)-4,4', CAS# 038613-77-3, and biphenylene diphosphonite, CAS# 119345-01-6 (commercially available from Sandoz Chemical Company under the trade designation P-EPQ) treated with 0.0 weight percent, and 0.10 weight percent of BSA for C.S. Q and Example 13, respectively.

EXAMPLE 14 AND COMPARATIVE SAMPLE R

The procedure of Example 1 is repeated using an ethylene-octene copolymer with melt index of 0.80 g/10 min (by ASTM D1238, 190° C./2.16 kg), density 0.905 g/cc (by ASTM D 792), Mw/Mn=4.04 and Mw=120,500 commercially available from The Dow Chemical Company under the trade designation ATTANE 4203 containing tetrakis (methylene(3,5-di-tert-butyl-4-hydroxhydro-cinnamate)) methane CAS# 006683-19-8, about 200 ppm weight percent; and Calcium Stearate, CAS# 001592-23-0, about 1250 ppm by weight, treated with 0.0 weight percent and treated with 0.10 weight percent of BSA for C.S. R and Example 14, respectively.

EXAMPLE 15 AND COMPARATIVE SAMPLE S

The procedure of Example 1 is repeated using an ethylene-butene copolymer with melt index of 1.2 g/10 min (by ASTM D1238, 190° C./2.16 kg), density 0.910 g/cc (by ASTM D 792), Mw/Mn=2.304 and Mw=118,700 commercially available from Exxon Chemical Company under the trade designation EXACT 3025, treated with 0.0 weight percent and 0.10 weight percent of BSA for C.S. S and Example 15, respectively.

TABLE 1

Viscosity measurements in English units

|  | viscosity 0.1 poise | Viscosity 100 poise | Viscosity 0.1/100 | Tan delta 0.1 | percent Viscosity 0.1 Change | percent Viscosity 100 Change | percent Tan delta Change | Viscosity 1000 poise | percent Viscosity Change | Comment |
|---|---|---|---|---|---|---|---|---|---|---|
| C.S. A | 1.29E+05 | 1.64E+03 | 7.85 | 4.6044 | 0 | 0 | 0 | 4518.6 | 0 | 1 MI, Narrow MWD |
| Ex. 1 | 2.11E+05 | 1.78E+03 | 11.82 | 2.9446 | 63 | 8 | −36 | 4714 | 4 | 0.908 Density |
| Ex. 2 | 4.40E+05 | 1.86E+03 | 23.72 | 1.7186 | 241 | 13 | −63 | 4701.8 | 4 | High Coupling |
| C.S. B | 7.15E+04 | 2.63E+03 | 2.72 | 33.027 | 0 | 0 | 0 | 4579.6 | 0 | 1.2 MI, Narrow MWD |
| Ex. 3 | 5.18E+05 | 2.66E+03 | 19.49 | 1.5901 | 625 | 1 | −95 | 4579.6 | 0 | 0.900 Density Butene |
| Ex. 4 | 1.65E+06 | 2.81E+03 | 58.85 | 0.7916 | 2214 | 7 | −98 | 4695.7 | 3 | No Coupling |
| C.S. C | 2.55E+05 | 1.32E+03 | 19.30 | 2.1627 | 0 | 0 | 0 | 3627.1 | 0 | 20 Mooney, Narrow MWD |
| Ex. 5 | 3.75E+05 | 1.36E+03 | 27.49 | 1.2659 | 47 | 3 | −41 | 3816.4 | 5 |  |
| Ex. 6 | 5.18E+05 | 1.36E+03 | 37.97 | 0.838 | 103 | 3 | −61 | 4439.2 | 22 |  |
| C.S. D | 8.26E+05 | 1.31E+03 | 62.84 | 0.992 | 0 | 0 | 0 | 3932.4 | 0 | 22 Mooney, Broad MWD |
| C.S. E | 5.92E+05 | 1.31E+03 | 45.34 | 1.2753 | −28 | −1 | 29 | 3517.2 | −11 |  |
| C.S. F | 9.29E+05 | 1.49E+03 | 62.55 | 1.0214 | 13 | 13 | 3 | 3724.8 | −5 |  |
| C.S. G | 2.07E+06 | 2.24E+03 | 92.54 | 0.6482 | 0 | 0 | 0 | 5446.7 | 0 |  |
| C.S. H | 2.18E+06 | 2.32E+03 | 94.18 | 0.6185 | 5 | 4 | −5 | 5684.9 | 4 | 44 Mooney, Broad MWD |
| C.S. I | 3.37E+06 | 2.33E+03 | 144.78 | 0.4572 | 63 | 4 | −29 | 6442 | 18 |  |
| C.S. J | 9.28E+04 | 1.67E+03 | 5.55 | 8.2516 | 0 | 0 | 0 | 4164.4 | 0 | 1 MI, Narrow MWD |
| Ex. 7 | 1.89E+05 | 1.68E+03 | 11.26 | 2.9234 | 104 | 1 | −65 | 4433.1 | 6 | 0.87 Density |
| Ex. 8 | 4.33E+05 | 1.87E+03 | 23.09 | 1.5487 | 366 | 12 | −81 | 4994.9 | 20 | Low Coupling |
| C.S. K | 1.18E+05 | 2.96E+03 | 3.98 | 9.6377 | 0 | 0 | 0 | 4433.1 | 0 | 1 MI, Narrow MWD |
| Ex. 9 | 5.56E+05 | 2.54E+03 | 21.93 | 1.4587 | 371 | −14 | −85 | 4336.4 | −2 | 0.87 Density Propylene? |
| Ex. 10 | 7.21E+05 | 3.00E+03 | 24.04 | 1.2873 | 511 | 1 | −87 | 4365.9 | −2 | No Coupling |
| C.S. L | 9.25E+04 | 1.72E+03 | 5.38 | 9.0761 | 0 | 0 | 0 | 3969 | 0 | 1 MI, Broad MWD Heterogeneous |
| C.S. M | 2.35E+05 | 1.68E+03 | 13.95 | 2.1441 | 153 | −2 | −76 | 4066.7 | 2 | 0.92 Density |
| C.S. N | 6.92E+05 | 2.04E+03 | 33.97 | 1.2156 | 648 | 18 | −87 | 3859.1 | −3 | No Coupling |
| C.S. P | 1.05E+05 | 1.92E+03 | 5.47 | 7.7074 | 0 | 0 | 0 | 4311 | 0 | 0.85 MI, Broad MWD |
| Ex. 11 | 2.04E+05 | 1.63E+03 | 12.50 | 2.4803 | 94 | −15 | −68 | 4280.4 | −1 | 0.92 Density |
| Ex. 12 | 4.35E+05 | 1.94E+03 | 22.46 | 1.5344 | 313 | 1 | −80 | 4072.8 | −6 | Low Coupling |
| C.S. Q | 1.47E+05 | 1.64E+04 | 8.96 |  | 0 | 0 |  |  |  |  |
| Ex. 13 | 6.20E+05 | 1.69E+04 | 36.69 |  | 422 | 3 |  |  |  |  |
| C.S. R | 1.46E+05 | 2.08E+04 | 7.02 |  | 0 | 0 |  |  |  |  |
| Ex. 14 | 8.90E+05 | 1.71E+04 | 52.05 |  | 610 | −18 |  |  |  |  |
| C.S. S | 8.74E+04 | 3.29E+04 | 2.66 |  | 0 | 0 |  |  |  |  |
| Ex. 15 | 1.63E+06 | 3.58E+04 | 45.53 |  | 1865 | 9 |  |  |  |  |

TABLE 1B

Summary of Melt Rheological Results in metric units (all viscosities in Pa-S (Pascal seconds))

|  | Viscosity 0.1 Pa-S | Viscosity 100 Pa-S | Viscosity 0.1/100 | Tan delta 0.1 | percent Viscosity 0.1 Change | percent Viscosity 10 Change | percent Tan delta Change | Viscosity 1000 Pa-S | percent Viscosity Change | Comment |
|---|---|---|---|---|---|---|---|---|---|---|
| C.S. A | 1.29E+04 | 1.64E+03 | 7.85 | 4.6044 | 0 | 0 | 0 | 451.86 | 0 | 1 MI, Narrow MWD |
| Ex. 1 | 2.11E+04 | 1.78E+03 | 11.82 | 2.9446 | 63 | 8 | −36 | 471.4 | 4 | 0.908 Density |
| Ex. 2 | 4.40E+04 | 1.86E+03 | 23.72 | 1.7186 | 241 | 13 | −63 | 470.18 | 4 | High Coupling |
| C.S. B | 7.15E+03 | 2.63E+03 | 2.72 | 33.027 | 0 | 0 | 0 | 457.96 | 0 | 1.2 MI, Narrow MWD |
| Ex. 3 | 5.18E+04 | 2.66E+03 | 19.49 | 1.5901 | 625 | 1 | −95 | 457.96 | 0 | 0.900 Density Butene |
| Ex. 4 | 1.65E+05 | 2.81E+03 | 58.85 | 0.7916 | 2214 | 7 | −98 | 469.57 | 3 | No Coupling |
| C.S. C | 2.55E+04 | 1.32E+03 | 19.30 | 2.1627 | 0 | 0 | 0 | 362.71 | 0 | 20 Mooney, Narrow MWD |
| Ex. 5 | 3.75E+04 | 1.36E+03 | 27.49 | 1.2659 | 47 | 3 | −41 | 381.64 | 5 |  |
| Ex. 6 | 5.18E+04 | 1.36E+03 | 37.97 | 0.838 | 103 | 3 | −61 | 443.92 | 22 |  |
| C.S. D | 8.26E+04 | 1.31E+03 | 62.84 | 0.992 | 0 | 0 | 0 | 393.24 | 0 | 22 Mooney, Broad MWD |
| C.S. E | 5.92E+04 | 1.31E+03 | 45.34 | 1.2753 | −28 | −1 | 29 | 351.72 | −11 |  |
| C.S. F | 9.29E+04 | 1.49E+03 | 62.55 | 1.0214 | 13 | 13 | 3 | 372.48 | −5 |  |
| C.S. G | 2.07E+05 | 2.24E+03 | 92.54 | 0.6482 | 0 | 0 | 0 | 544.67 | 0 |  |
| C.S. H | 2.18E+05 | 2.32E+03 | 94.18 | 0.6185 | 5 | 4 | −5 | 568.49 | 4 | 44 Mooney, Broad MWD |
| C.S. I | 3.37E+05 | 2.33E+03 | 144.78 | 0.4572 | 63 | 4 | −29 | 644.2 | 18 |  |
| C.S. J | 9.28E+03 | 1.67E+03 | 5.55 | 8.2516 | 0 | 0 | 0 | 416.44 | 0 | 1 MI, Narrow MWD |
| Ex. 7 | 1.89E+04 | 1.68E+03 | 11.26 | 2.9234 | 104 | 1 | −65 | 443.31 | 6 | 0.87 Density |

TABLE 1B-continued

Summary of Melt Rheological Results in metric units (all viscosities in Pa-S (Pascal seconds))

|  | Viscosity 0.1 Pa-S | Viscosity 100 Pa-S | Viscosity 0.1/100 | Tan delta 0.1 | percent Viscosity 0.1 Change | percent Viscosity 10 Change | percent Tan delta Change | Viscosity 1000 Pa-S | percent Viscosity Change | Comment |
|---|---|---|---|---|---|---|---|---|---|---|
| Ex. 8 | 4.33E+04 | 1.87E+03 | 23.09 | 1.5487 | 366 | 12 | −81 | 499.49 | 20 | Low Coupling |
| C.S. K | 1.18E+04 | 2.96E+03 | 3.98 | 9.6377 | 0 | 0 | 0 | 443.31 | 0 | 1 MI, Narrow MWD |
| Ex. 9 | 5.56E+04 | 2.54E+03 | 21.93 | 1.4587 | 371 | −14 | −85 | 433.64 | −2 | 0.87 Density Propylene? |
| Ex. 10 | 7.21E+04 | 3.00E+03 | 24.04 | 1.2873 | 511 | 1 | −87 | 436.59 | −2 | No Coupling |
| C.S. L | 9.25E+03 | 1.72E+03 | 5.38 | 9.0761 | 0 | 0 | 0 | 396.9 | 0 | 1 MI, Broad MWD Heterogeneous |
| C.S. M | 2.35E+04 | 1.68E+03 | 13.95 | 2.1441 | 153 | −2 | −76 | 406.67 | 2 | 0.92 Density |
| C.S. N | 6.92E+04 | 2.04E+03 | 33.97 | 1.2156 | 648 | 18 | −87 | 385.91 | −3 | No Coupling |
| C.S. P | 1.05E+04 | 1.92E+03 | 5.47 | 7.7074 | 0 | 0 | 0 | 431.1 | 0 | 0.85 MI, Broad MWD |
| Ex. 11 | 2.04E+04 | 1.63E+03 | 12.50 | 2.4803 | 94 | −15 | −68 | 428.04 | −1 | 0.92 Density |
| Ex. 12 | 4.35E+04 | 1.94E+03 | 22.46 | 1.5344 | 313 | 1 | −80 | 407.28 | −6 | Low Coupling |
| C.S. Q | 1.47E+04 | 1.64E+03 | 8.96 |  | 0 | 0 |  |  |  |  |
| Ex. 13 | 6.20E+04 | 1.69E+03 | 36.69 |  | 422 | 3 |  |  |  |  |
| C.S. R | 1.46E+04 | 2.08E+03 | 7.02 |  | 0 | 0 |  |  |  |  |
| Ex. 14 | 8.90E+04 | 1.71E+03 | 52.05 |  | 610 | −18 |  |  |  |  |
| C.S. S | 8.74E+03 | 3.29E+03 | 2.66 |  | 0 | 0 |  |  |  |  |
| Ex. 15 | 1.63E+05 | 3.58E+03 | 45.53 |  | 1865 | 9 |  |  |  |  |

The rheology modification efficiency is surprisingly influenced by the molecular weight distribution, molecular weight, type of comonomer, and the comonomer content. In general, the trend is that the narrow distribution polymers or higher comonomer content polymers show better rheology modification efficiency. The degree of efficiency is dependent on the type of polymer, and this is discussed hereinafter. These significant changes as the MWD becomes more narrow are all unexpected.

For the three EPDM samples (Example 6, C.S. F and C.S. I), the largest degree of rheology modification was seen for the Example 6 which was prepared using metallocene catalyst. (These results discussed are at the 0.1 percent azide level). The low shear viscosity (viscosity 0.1 rad/s) increased by 103 percent over that of the base polymer with the higher shear viscosities increasing less substantially at 3 percent at 100 rad/s and 22 percent at 1000 1/s. Thus, a substantial increase in low shear viscosity (100 percent at 0.1 rad/s) correlatable with increases in melt strength were observed for a metallocene based EPDM with less substantial changes in high shear viscosity (3 percent at 100 rad/s) reflecting good processability. The higher molecular weight C.S. I showed significant modification with a low shear viscosity increase of 63 percent with increases in high shear viscosity being 4 percent at 100 rad/s. The lower molecular weight, C.S. F showed more minor changes of 13 percent in the low shear viscosity and a 13 percent change in the high shear viscosity. The tan delta at 0.1 rad/s change also decreased substantially from 3 percent to −29 percent to −61 percent from the C.S. E and C.S. F to Examples 5 and 6. (Note: C.S. D and C.S. E with 0.05 percent azide were rerun to verify that there was a slight drop in low shear viscosity with 0.05 percent azide).

For the narrow distribution substantially linear copolymers (Example 1 and 2 and Example 7 and 8), the higher comonomer content polymer (Example 7 and 8) has better rheology modification efficiency, probably due to higher comonomer content. For example, at 0.1 weight percent coupling agent, the viscosity changes at 0.1 rad/sec are 241 percent for Example 2 and 366 percent for Example 8.

For the narrow distribution linear copolymers (Examples 3 and 4 and Examples 9 and 10), the rheology modification efficiency is high due to the combination of narrow MWD and high comonomer content. For a given density, the comonomer content used in these polymers (i.e. butene and propylene, respectively) is higher than a corresponding density ethylene-octene copolymer. For example, at 0.1 weight percent coupling agent, the viscosity changes at 0.1 rad/sec are 241 percent for Example 2 and 2214 percent for Example 4.

The result of C.S. M is quite surprising. Although the MWD of this polymer is broader, the rheology modification efficiency is very high. For example, at 0.1 weight percent coupling agent, the viscosity changes at 0.1 rad/sec are 241 percent for Example 2 and 648 percent for C.S. M.

The C.S. E and C.S. F showed a minor effect of coupling in terms of minor changes in storage modulus and Tg. No Tg shift was observed for the C.S. H and C.S. I with slight increases in modulus with increasing azide level. Examples 5 and 6 showed a significant shift in storage modulus increasing by 38 percent at 25° C. and by 167 percent at 153° C. The Tg was also raised 7° C. at the 0.1 percent level.

In the polyethylene examples, Examples 1 and 2 showed a broadening and raising of the Tg with coupling and a significant increase in modulus (60 percent) in the melt regime (the temperature greater than 100° C.). Examples 7 and 8 showed no significant shift in Tg, a significant increase in room temperature modulus and a large increase in the high temperature modulus (471 percent). Examples 3 and 4 showed a broadening and increase of Tg with coupling with significant increases in room temperature modulus (43 percent) and high temperature modulus (5914 percent). Examples 9 and 10 showed an increase in Tg of 3° C., an increase in room temperature modulus of 30 percent and an increase in high temperature modulus of 1017 percent. C.S. M and C.S. N showed no significant increase in Tg but an increase in the intensity of the alpha (melting) transition, an increase in room temperature modulus of 40 percent and high temperature modulus of 605 percent. Examples 11 and 12 showed a similar increase in the intensity of the alpha transition, no change in room temperature modulus and a 510 percent increase in higher temperature modulus.

In summary, the melt Theological behavior, shows the largest differences between the comparative samples (not subjected to coupling reactions) due to coupling in the practice of the invention.

What is claimed is:

1. A composition comprising a rheology modified, coupled polymer reaction product formed by heating an admixtures the admixture comprising (1) at least one polyolefin comprising ethylene and at least one comonomer which consist of alpha olefins comprising at least 3 carbon atoms, dienes and combinations thereof, wherein said polyolefin has a molecular weight distribution of less than or equal to about 3 and (2) a coupling amount of from 0.01 to about 5 weight percent of polymers in the admixture of at least one poly(sulfonyl azide) to at least the decomposition temperature of the poly(sulfonyl azide) for a period sufficient for decomposition of at least about 80 weight percent of the poly(sulfonyl azide) the phrase, wherein coupling is indicated by a viscosity change at a shear frequency of 0.1 rad/sec of greater than 5 perecent.

2. The composition of claim 1 wherein the polyolefin has a density greater than about 0.945 g/mL.

3. An article which comprises a composition of claim 1.

4. The article of claim 3 wherein the article is formed from a melt of the composition.

5. The process of formation of the article of claim 3 by molding, blow molding or extrusion blow molding the composition.

6. The article of claim 5 which is a bottle, pipe, fuel tank, fuel filler neck, or milk jug.

7. The composition of claim 1 wherein the composition has a gel content less than about 10% by weight.

* * * * *